(12) United States Patent
Mountz

(10) Patent No.: US 8,113,523 B2
(45) Date of Patent: Feb. 14, 2012

(54) BACKREST RECLINING MECHANISM AND RELATED STROLLER

(75) Inventor: Jonathan Mountz, Central (HK)

(73) Assignee: Wonderland Nurserygoods Company Limited, Central (HK)

( * ) Notice: Subject to any disclaimer, the term of this patent is extended or adjusted under 35 U.S.C. 154(b) by 0 days.

(21) Appl. No.: 12/889,387

(22) Filed: Sep. 23, 2010

(65) Prior Publication Data

US 2011/0084458 A1   Apr. 14, 2011

Related U.S. Application Data

(60) Provisional application No. 61/278,957, filed on Oct. 14, 2009.

(51) Int. Cl.
*B62B 7/00* (2006.01)

(52) U.S. Cl. ........... 280/47.4; 280/47.38; 280/644

(58) Field of Classification Search .......... 280/42, 280/47.38, 47.4, 642, 643, 644, 647, 648, 280/650, 657, 658; 297/354.12, 219.12, 297/354.1, 363, 366, 367, 377
See application file for complete search history.

(56) References Cited

U.S. PATENT DOCUMENTS

| | | | | |
|---|---|---|---|---|
| 2,726,481 A * | 12/1955 | Sebel | ........................... | 446/451 |
| 3,521,059 A * | 7/1970 | Stolle | ........................... | 378/59 |
| 3,910,611 A * | 10/1975 | Slovensky, Jr. | ........................... | 292/38 |
| 4,077,641 A * | 3/1978 | Perego | ........................... | 280/42 |
| 4,317,581 A * | 3/1982 | Kassai | ........................... | 280/644 |
| 4,360,180 A * | 11/1982 | Bruneau | ........................... | 248/162.1 |
| 4,391,453 A * | 7/1983 | Glaser | ........................... | 280/47.4 |
| 4,433,869 A * | 2/1984 | Payne et al. | ........................... | 297/5 |
| 4,462,607 A * | 7/1984 | Nakao et al. | ........................... | 280/644 |
| 4,618,184 A * | 10/1986 | Harvey | ........................... | 297/19 |
| 4,619,208 A * | 10/1986 | Kurrasch | ........................... | 108/147 |
| 4,723,815 A * | 2/1988 | Kassai | ........................... | 297/354.12 |
| 4,741,056 A * | 5/1988 | Kassai | ........................... | 5/99.1 |
| 4,763,919 A * | 8/1988 | Nakao et al. | ........................... | 280/644 |
| 4,773,702 A * | 9/1988 | Takahashi et al. | ........................... | 297/218.1 |
| 4,805,928 A * | 2/1989 | Nakao et al. | ........................... | 280/642 |
| 4,832,361 A * | 5/1989 | Nakao et al. | ........................... | 280/642 |
| 5,195,770 A * | 3/1993 | Ishikura | ........................... | 280/648 |
| 5,307,707 A * | 5/1994 | Roelle | ........................... | 74/502.6 |
| 5,417,449 A * | 5/1995 | Shamie | ........................... | 280/642 |
| 5,490,685 A * | 2/1996 | Kitayama et al. | ........................... | 280/47.38 |
| 5,645,317 A * | 7/1997 | Onishi et al. | ........................... | 297/250.1 |

(Continued)

FOREIGN PATENT DOCUMENTS

EP   1 437 286 A2   7/2004

(Continued)

*Primary Examiner* — J. Allen Shriver, II
*Assistant Examiner* — Brodie Follman
(74) *Attorney, Agent, or Firm* — Winston Hsu; Scott Margo

(57) ABSTRACT

A backrest reclining mechanism is applied to a stroller. The backrest reclining mechanism includes a fabric, at least one pulley, at least one cable, and an adjusting device. The fabric is disposed around a backrest of the stroller. Two ends of the fabric are connected to two sides of a main body of the stroller respectively. The pulley is rotatably disposed on the backrest. The cable is wound around the pulley. A first end of the cable extends within the fabric to be connected to the main body. The adjusting device is movably disposed on the backrest and connected to a second end of the cable. The adjusting device is used for changing a length of the cable between the first end and the pulley when moving, so as to adjust a reclining angle of the backrest.

17 Claims, 5 Drawing Sheets

U.S. PATENT DOCUMENTS

| | | | |
|---|---|---|---|
| 5,662,380 A * | 9/1997 | Tam et al. | 297/354.12 |
| 5,681,084 A * | 10/1997 | Yoneda | 297/284.9 |
| 5,738,410 A * | 4/1998 | Stroud et al. | 297/354.12 |
| 5,749,627 A * | 5/1998 | Perego | 297/370 |
| 5,806,877 A * | 9/1998 | Huang | 280/642 |
| 5,820,218 A * | 10/1998 | Baloche et al. | 297/367 R |
| 5,833,261 A * | 11/1998 | Brown et al. | 280/642 |
| 5,941,150 A * | 8/1999 | Kropf et al. | 83/231 |
| 6,139,102 A * | 10/2000 | von Moller | 297/284.4 |
| 6,322,097 B1 * | 11/2001 | Lan | 280/642 |
| 6,346,088 B1 * | 2/2002 | Stone et al. | 601/99 |
| 6,471,222 B1 * | 10/2002 | Hsia | 280/47.4 |
| 6,557,871 B2 * | 5/2003 | Hsia | 280/47.38 |
| 6,682,144 B2 * | 1/2004 | Klingler | 297/284.4 |
| 6,688,685 B2 * | 2/2004 | Kain | 297/250.1 |
| 6,695,410 B2 * | 2/2004 | Hsia | 297/452.4 |
| 6,702,316 B2 * | 3/2004 | Hsia | 280/648 |
| 6,830,254 B2 * | 12/2004 | Lan | 280/47.4 |
| 6,890,031 B2 * | 5/2005 | Rhein | 297/284.9 |
| 6,908,100 B2 * | 6/2005 | Kassai et al. | 280/642 |
| 6,923,467 B2 * | 8/2005 | Hsia | 280/648 |
| 6,938,914 B2 * | 9/2005 | Kassai et al. | 280/642 |
| 6,951,342 B2 * | 10/2005 | Lan | 280/47.4 |
| 6,979,018 B2 * | 12/2005 | Kassai et al. | 280/648 |
| 7,008,018 B2 * | 3/2006 | Chen | 297/363 |
| 7,128,326 B2 * | 10/2006 | Chen | 280/47.4 |
| 7,182,363 B2 * | 2/2007 | Takubo et al. | 280/644 |
| 7,284,797 B2 * | 10/2007 | Huang | 297/354.12 |
| 7,313,836 B1 * | 1/2008 | Swezey et al. | 5/634 |
| 7,364,235 B2 * | 4/2008 | Chen et al. | 297/377 |
| 7,575,281 B2 * | 8/2009 | Jeong | 297/367 R |
| 7,658,446 B2 * | 2/2010 | Meeker et al. | 297/250.1 |
| 7,819,478 B2 * | 10/2010 | Griswold et al. | 297/378.13 |
| 7,871,100 B2 * | 1/2011 | Chen et al. | 280/642 |
| 7,887,085 B2 * | 2/2011 | Wang | 280/650 |
| 2002/0158434 A1 * | 10/2002 | Hsia | 280/47.4 |
| 2003/0052474 A1 | 3/2003 | Yang | |
| 2004/0150174 A1 * | 8/2004 | Lan | 280/47.4 |
| 2005/0029852 A1 * | 2/2005 | Chen | 297/354.12 |
| 2006/0192419 A1 * | 8/2006 | Cheng et al. | 297/354.12 |
| 2006/0214490 A1 | 9/2006 | Huang | |
| 2007/0069566 A1 * | 3/2007 | Li | 297/377 |
| 2007/0096528 A1 * | 5/2007 | Nolan et al. | 297/363 |
| 2007/0102980 A1 * | 5/2007 | Chen | 297/354.12 |
| 2008/0001459 A1 * | 1/2008 | Chen et al. | 297/377 |
| 2008/0238042 A1 * | 10/2008 | Chen et al. | 280/650 |
| 2008/0258437 A1 * | 10/2008 | Ryan et al. | 280/650 |
| 2010/0244527 A1 * | 9/2010 | Chen | 297/354.12 |
| 2010/0323769 A1 * | 12/2010 | Peng et al. | 455/575.4 |
| 2011/0049955 A1 * | 3/2011 | Cheng | 297/354.12 |

FOREIGN PATENT DOCUMENTS

| | | |
|---|---|---|
| EP | 1 437 286 A3 | 11/2006 |
| GB | 2 178 306 A | 2/1987 |
| GB | 2178306 A * | 2/1987 |

* cited by examiner

BACKREST RECLINING MECHANISM AND RELATED STROLLER

CROSS REFERENCE TO RELATED APPLICATIONS

This application claims the benefit of U.S. Provisional Application No. 61/278,957, which was filed on Oct. 14, 2009 and is incorporated herein by reference.

BACKGROUND OF THE INVENTION

1. Field of the Invention

The present invention relates to a backrest reclining mechanism and a related stroller, and more specifically, to a backrest reclining mechanism and a related stroller capable of adjusting a reclining angle of a backrest relative to a seat portion by utilizing an adjusting device.

2. Description of the Prior Art

For parents, a stroller is a convenient and common tool for taking care of a baby. For increasing comfort, a backrest installed on a stroller is usually adjustable in reclining. For example, when the backrest is positioned at an upright angle, the baby can sit in the stroller and lay his back upon the backrest comfortably. On the other hand, if the backrest is positioned at a near-horizontal angle, the baby can sleep well in the stroller horizontally for preventing the baby from swaying front to back and left to right with his head bobbing.

A common design for performing angle adjustment of a backrest is to utilize grips disposed at two sides of a stroller respectively. However, the said design requires a user to use two hands to adjust the reclined angle of the backrest since the user needs to press the grips disposed at two sides of the stroller respectively at the same time, and therefore it is inconvenient in use. Another common design is to utilize a connecting rod to pull a connecting cable connected to engaging parts disposed at two sides of a stroller respectively for fixing a reclined angle of a backrest. Although the said design allows the user to perform the angle adjustment of the backrest with only one hand, it usually utilizes complicated mechanism. Furthermore, the said complicated mechanism also deteriorates the look of the stroller.

SUMMARY OF THE INVENTION

The present invention provides a backrest reclining mechanism applied to a stroller, the stroller comprising a main body having a seat portion, and a backrest pivotally connected to the seat portion, the backrest reclining mechanism comprising a fabric disposed around the backrest, two ends of the fabric being connected to two sides of the main body respectively for supporting the backrest cooperatively with the main body; at least one pulley rotatably disposed on the backrest; at least one cable wound around the pulley, a first end of the cable extending within the fabric to be connected to the main body; and an adjusting device movably disposed on the backrest and connected to a second end of the cable, the adjusting device being used for changing a length of the cable between the first end and the pulley when the adjusting device moves relative to the backrest, so as to adjust a reclining angle of the backrest relative to the seat portion.

The present invention further provides a stroller comprising a main body having a seat portion; a backrest pivotally connected to the seat portion; and a backrest reclining mechanism comprising a fabric disposed around the backrest, two ends of the fabric being connected to two sides of the main body respectively for supporting the backrest cooperatively with the main body; at least one pulley rotatably disposed on the backrest; at least one cable wound around the pulley, a first end of the cable extending within the fabric to be connected to the main body; and an adjusting device movably disposed on the backrest and connected to a second end of the cable, the adjusting device being used for changing a length of the cable between the first end and the pulley when the adjusting device moves relative to the backrest, so as to adjust a reclining angle of the backrest relative to the seat portion.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
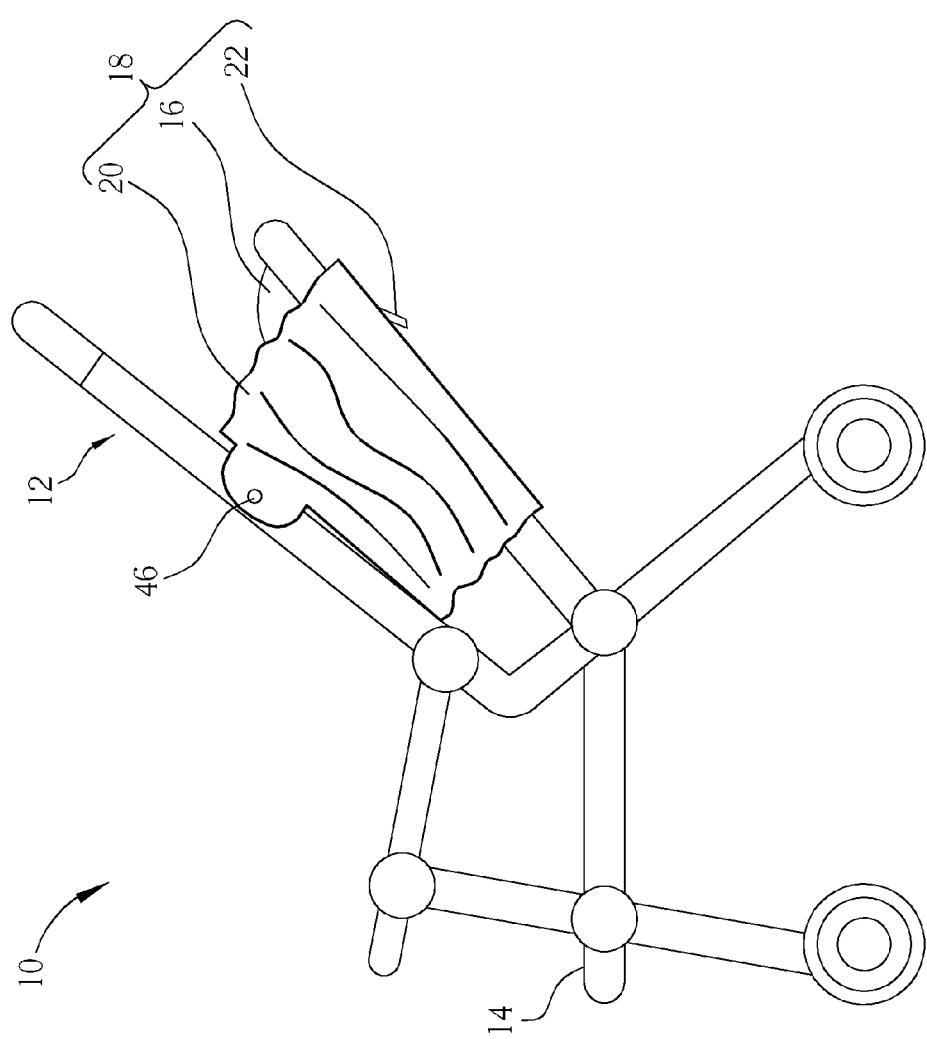
FIG. 1 is a side view of a stroller according to a preferred embodiment of the present invention.

Please refer to FIG. 1, which is a side view of a stroller 10 according to a preferred embodiment of the present invention. As shown in FIG. 1, the stroller 10 includes a main body 12, a backrest 16, and a backrest reclining mechanism 18. The main body 12 is an assembly of the major structures (e.g. a wheel set, a handle, and so on) of the stroller 10 including a seat portion 14. The backrest 16 is pivotally connected to the seat portion 14. As shown in FIG. 1, the backrest reclining mechanism 18 includes a flexible member such as a fabric 20, and an adjusting device 22. The fabric 20 is disposed around the backrest 16. Two ends of the fabric 20 are connected to two sides of the main body 12 respectively for supporting the backrest 16 cooperatively with the main body 12.

Figure 2:
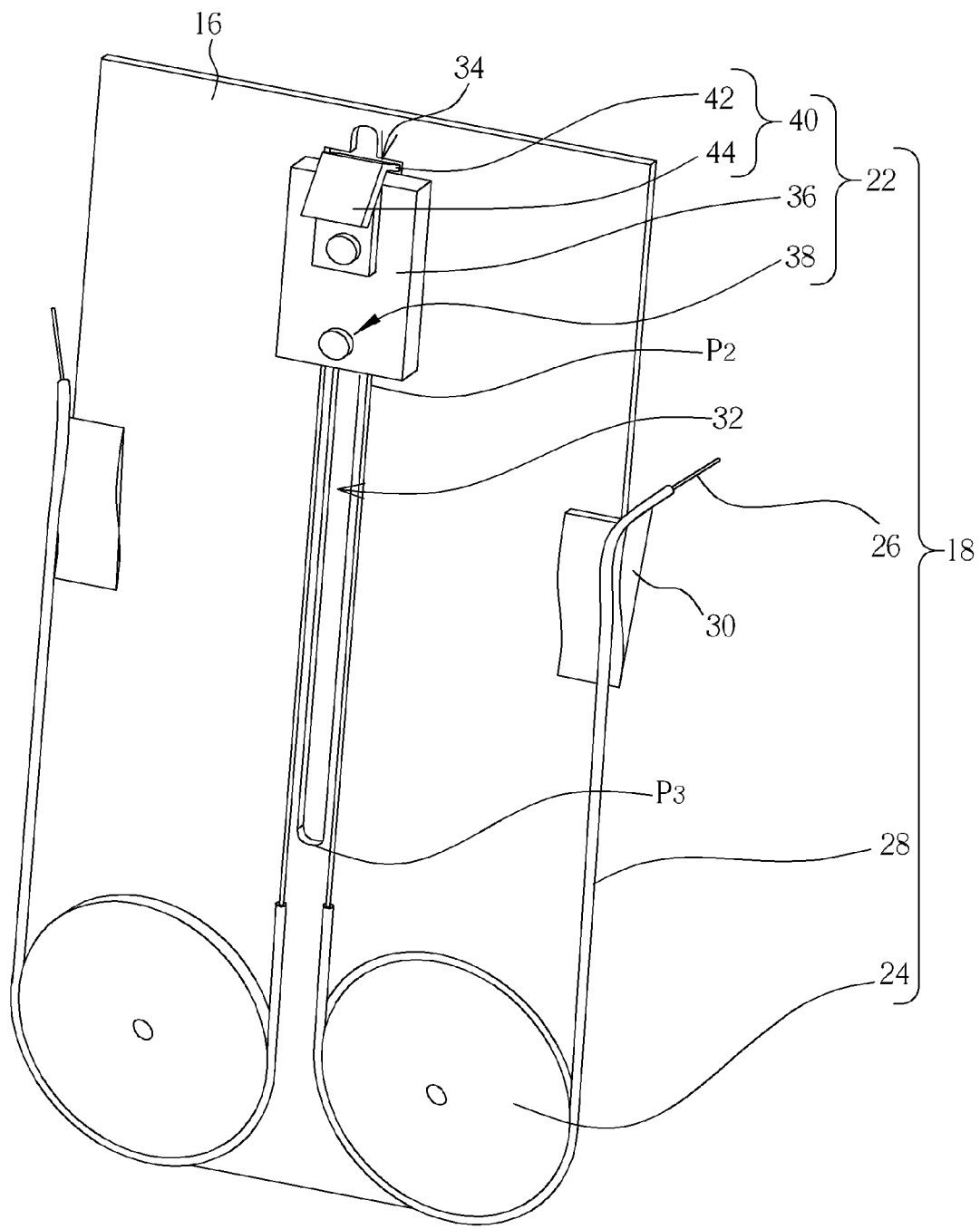
FIG. 2 is an enlarged diagram of a backrest reclining mechanism in FIG. 1.

Next, please refer to FIG. 2, which is an enlarged diagram of the backrest reclining mechanism 18 in FIG. 1. As shown in FIG. 2, the backrest reclining mechanism 18 further includes at least one pulley 24 (two shown in FIG. 2), at least one cable 26 (two shown in FIG. 2), and at least one protection pipe 28 (two shown in FIG. 2), and the backrest 16 has at least one supporting portion 30 (two shown in FIG. 2). A guiding slot 32 is formed on the backrest 16 and has a positioning slot 34 communicated therewith. The supporting portion 30 is used for supporting the cable 26. In this embodiment, as shown in FIG. 2, the cable 26 is diverted about 90° at a position where the supporting portion 30 supports the cable 26. In such a manner, not only motion of the cable 26 along the pulley 24 can be more steady and smooth, but disposal of the cable 26 on the backrest 16 can be more firm.

The following description only illustrates connection of the adjusting device 22 to one set of the pulley 24 and the cable 26 for simplicity. As for connection of the adjusting device 22 to the other set of the pulley 24 and the cable 26, it can be reasoned by analogy and the related description is omitted herein.

As shown in FIG. 2, the pulley 24 is rotatably disposed on the backrest 16. The cable 26 is wound around the pulley 24, and the protection pipe 28 envelops the cable 26 for protecting the pulley 24 from being damaged when the cable 26 moves therealong. The adjusting device 22 is movably disposed on the backrest 16. The adjusting device 22 includes a sliding board 36, at least one guide pin 38 (two shown in FIG. 2), and a resilient clip 40. The sliding board 36 is connected to a second end $P_2$ of the cable 26, and the guide pin 38 is disposed on the sliding board 36 and is positioned in the guiding slot 32, so that the sliding board 36 can travel upward and downward along the guiding slot 32 via the guidance of the guide pin 38. The resilient clip 40 is disposed on the sliding board 36 and having a positioning portion 42 and a pressing portion 44. The positioning portion 42 is used for selectively engaging with the positioning slot 34 to fix a position of the sliding board 36 relative to the backrest 16, or being separate from the positioning slot 34 when the pressing portion 44 is pressed such that the reclining of the backrest 16 is adjustable.

Figure 3:
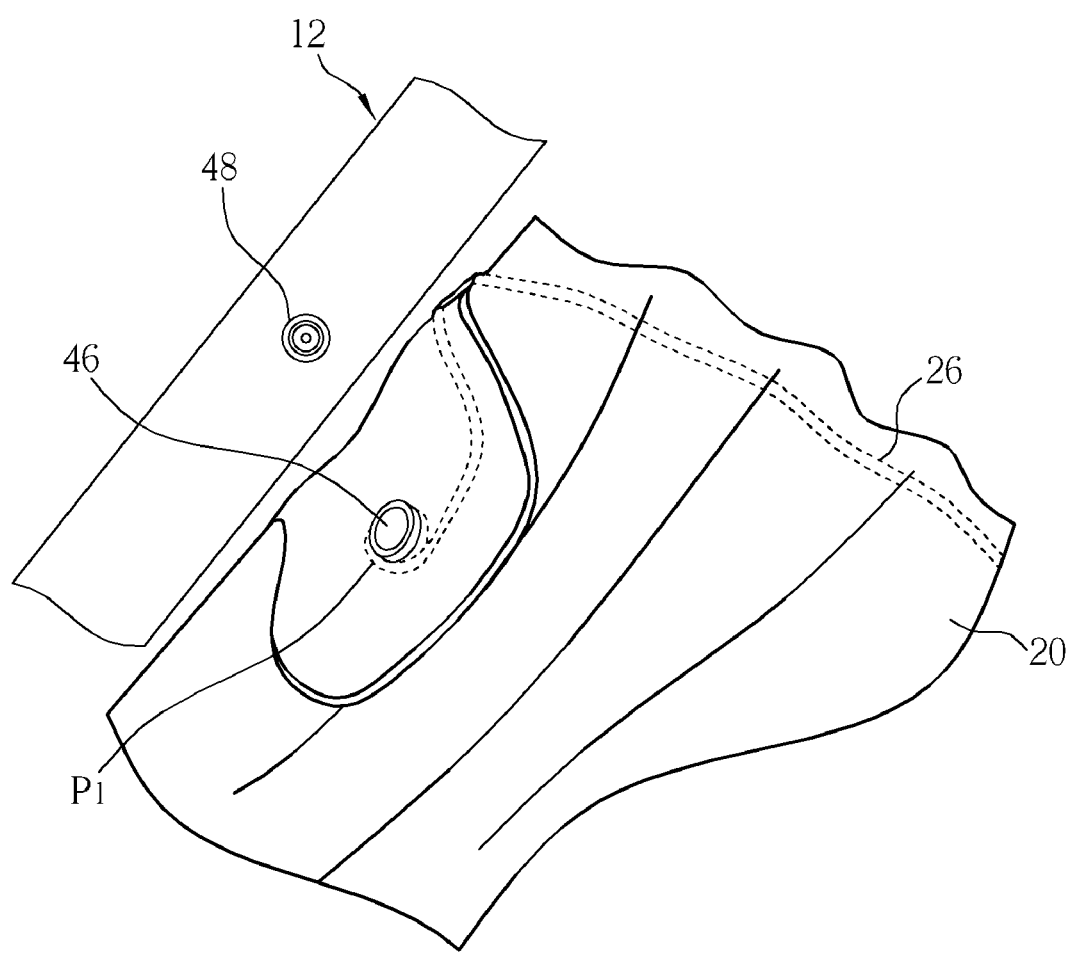
FIG. 3 is a partial enlarged diagram of a fabric in FIG. 1 being detached from a main body.

For connection of the fabric 20 and the main body 12, please refer to FIG. 3, which is a partial enlarged diagram of the fabric 20 in FIG. 1 being detached from the main body 12. As shown in FIG. 3, the fabric 20 has a first engaging part 46 and the main body 12 has a corresponding second engaging part 48, wherein the first engaging part 46 and the second engaging part 48 are complementary snappers. The first engaging part 46 is used for engaging with the second engaging part 48 so as to fix the fabric 20 onto the main body 12. Furthermore, a first end $P_1$ of the cable 26 extends within the fabric 20 and is preferably connected to the first engaging part 46 in a winding manner for fixing to the fabric 20. Accordingly, when the first engaging part 46 is engaged with the second engaging part 48, the cable 26 can be fixed to the main body 12 for supporting the backrest 16 cooperatively with the fabric 20 and the main body 12. The design for connecting the fabric 20 to the main body 12 is not limited to that as shown in FIG. 3. That is, the fabric 20 can also be connected to the main body 12 by other engaging parts such as Velcro(hook-and-loop) fasteners. As for which design is utilized, it depends on the practical application of the backrest reclining mechanism 18.

Figure 4:
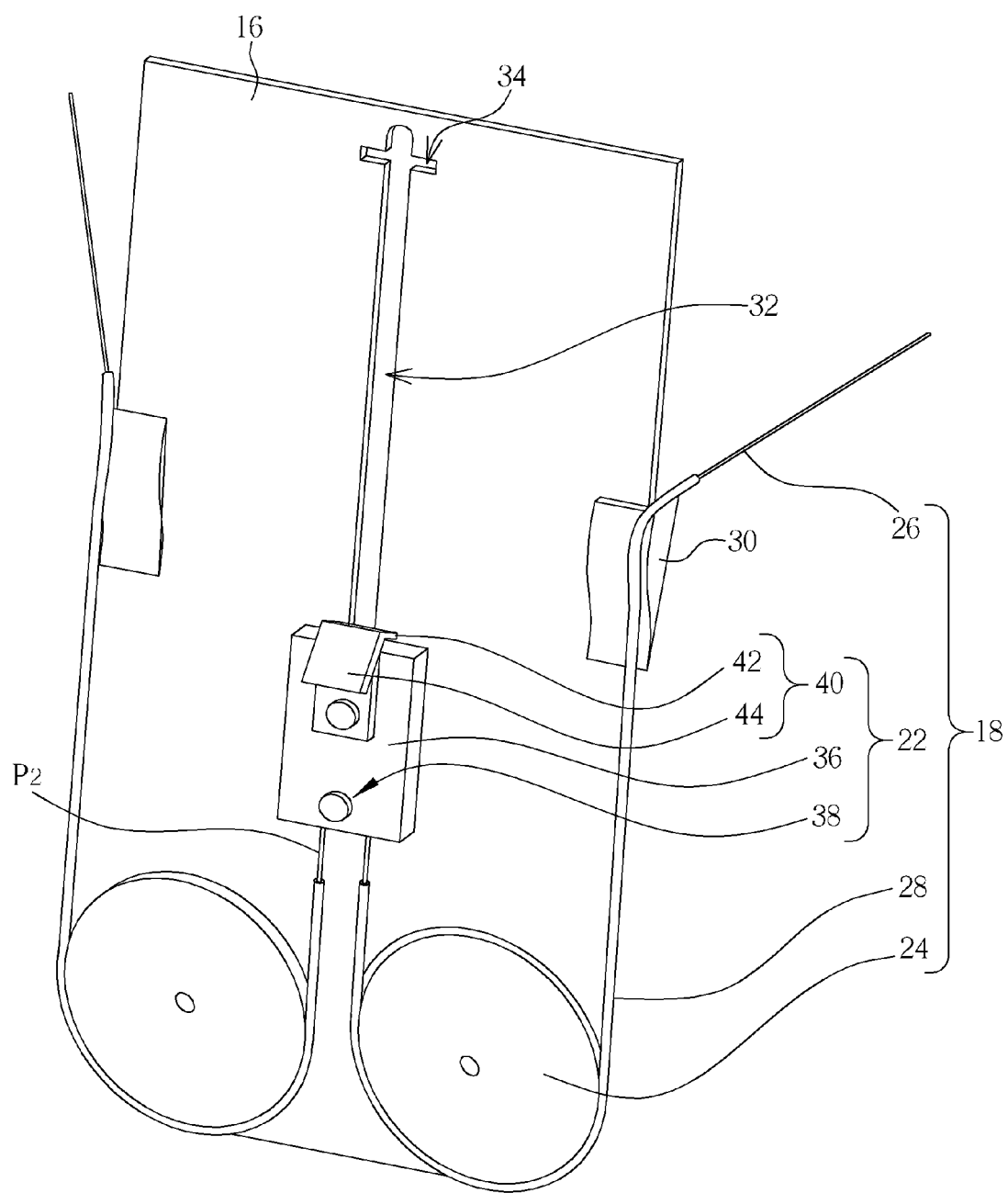
FIG. 4 is a diagram of an adjusting device in FIG. 2 moving to a bottom end of a guiding slot.
Figure 5:
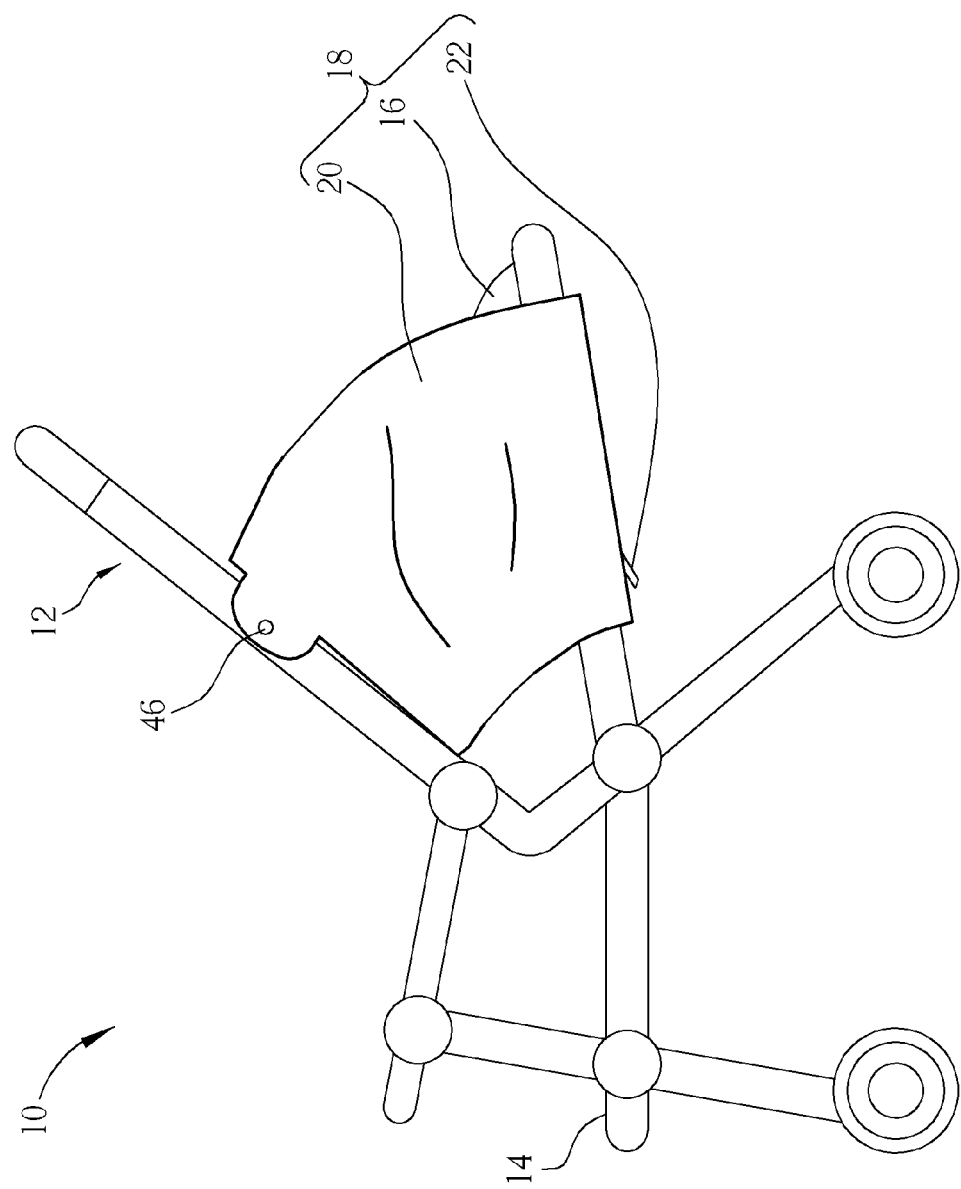
FIG. 5 is a side view of the stroller after a backrest in FIG. 1 is laid down relative to a seat portion.

More detailed description for the reclining angle adjustment of the backrest 16 via the backrest reclining mechanism 18 is provided as follows. Please refer to FIG. 1, FIG. 2, FIG. 4, and FIG. 5. FIG. 4 is a diagram of the adjusting device 22 moving to a bottom end $P_3$ of the guiding slot 32 in FIG. 2. FIG. 5 is aside view of the stroller 10 after the backrest 16 in FIG. 1 rotates relative to the seat portion 14. If a user wants to fix the backrest 16 at a reclining angle as shown in FIG. 1, the user just needs to move the adjusting device 22 to a position as shown in FIG. 2 until the positioning portion 42 of the resilient clip 40 is engaged with the positioning slot 34. At this time, since the cable 26 is connected between the sliding board 36 and the fabric 20 which is connected to the main body 12 as mentioned above, the backrest 16 can be pushed to rotate to a position as shown in FIG. 1 relative to the seat portion 14 and then be fixed at the reclining angle as shown in FIG. 1 via engagement of the positioning portion 42 of the resilient clip 40 with the positioning slot 34. In such a manner, the stroller 10 can allow a baby to sit on the seat portion 14 and then lay his back upon the backrest 16 comfortably.

On the other hand, if the user wants to rotate the backrest 16 from the position as shown in FIG. 1 to a position as shown in FIG. 5, the user just needs to press the pressing portion 44 first so as to disengage the positioning portion 42 of the resilient clip 40 from the positioning slot 34 as shown in FIG. 2. That is, when the user presses the pressing portion 44 in FIG. 2, the positioning portion 42 can be separate from the positioning slot 34. Subsequently, the user can pull the adjusting device 22 to move downward along the guiding slot 32 until the guide pin 38 abuts against the bottom end $P_3$ of the guiding slot 32. As shown in FIG. 4, since a length of the cable 26 between the first end $P_1$ and the pulley 24 is increased as a length of the cable 26 between the second end $P_2$ and the pulley 24 is decreased, the backrest 16 is no longer limited by the cable 26. Accordingly, the backrest 16 can be laid down by gravity or be pulled downward by the user to recline as shown in FIG. 5. At this time, since the backrest 16 is supported by the fabric 20 cooperatively with the main body 12, the backrest 16 can be positioned at a near horizontal angle (over 150°) as shown in FIG. 5. In such a manner, the stroller 10 can allow a baby to sleep thereon horizontally for preventing the baby from swaying front to back and left to right with his head bobbing, so as to create a more comfortable ride for the sleeping baby.

It should be mentioned that number of the positioning slot 34 is not limited to the said embodiment. That is, the number of the positioning slot 34 can be increased to more than one along the guiding slot 32 so that the backrest 16 can be locked into different reclining positions by engagement of the positioning portion 42 of the resilient clip 40 with different positioning slots 34.

Compared with the prior art, the present invention utilizes linkage of the adjusting device, the cable, the pulley and the fabric to position the backrest at different reclining angles relative to the seat portion instead, so as to make a baby in the stroller feel more comfortable no matter the baby is awake or sleeping. Furthermore, the present invention can not only enhance operability of the backrest in angle adjustment via the simple linkage design and the intuitive pressing design of the backrest reclining mechanism so that the sliding movement of the adjusting device is consistent with the pivoting movement of the backrest, but can also make the look of the stroller aesthetic, compact, and almost completely unaltered via the design of the cable being hidden under the fabric.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backrest reclining mechanism applied to a stroller, the stroller comprising a main body having a seat portion, and a backrest pivotally connected to the seat portion, wherein the backrest comprises a guiding slot formed on the backrest and at least one positioning slot in communication with the guiding slot, the backrest reclining mechanism comprising:

a fabric disposed around the backrest, two ends of the fabric being connected to two sides of the main body respectively for supporting the backrest cooperatively with the main body;

at least one pulley rotatably disposed on the backrest;

at least one cable wound around the pulley, a first end of the cable extending within the fabric to be connected to the main body; and an adjusting device movably disposed on the backrest and connected to a second end of the cable, the adjusting device being used for changing a length of the cable between the first end and the pulley when the adjusting device moves relative to the backrest, so as to adjust a reclining angle of the backrest relative to the seat portion, the adjusting device comprising:

a sliding board movably disposed along the guiding slot and connected to the second end of the cable; and a resilient clip disposed on the sliding board and having a positioning portion and a pressing portion, the positioning portion being used for selectively inserting into and engaging with the positioning slot to fix a position of the sliding board relative to the backrest, or for separating from the positioning slot when the pressing portion is pressed.

2. The backrest reclining mechanism of claim 1, wherein the first end of the cable is connected to a position where the fabric is connected to the main body.

3. The backrest reclining mechanism of claim 1, wherein the adjusting device further comprises:
    at least one guide pin disposed on the sliding board and positioned in the guiding slot, the guide pin being used for guiding the sliding board along the guiding slot.

4. The backrest reclining mechanism of claim 1, wherein two ends of the fabric have a first engaging part respectively, two sides of the main body have a corresponding second engaging part respectively, and the first engaging part is used for engaging with the second engaging part so as to fix the fabric onto the main body.

5. The backrest reclining mechanism of claim 4, wherein the first and the second engaging parts are one of complementary snappers and hook-and-loop fasteners.

6. The backrest reclining mechanism of claim 4, wherein the first end of the cable is connected to the first engaging part.

7. The backrest reclining mechanism of claim 1, wherein the backrest has a supporting portion for supporting the cable.

8. The backrest reclining mechanism of claim 1 further comprising:
    a protection pipe enveloping the cable.

9. A stroller comprising:
    a main body having a seat portion;
    a backrest pivotally connected to the seat portion;
    a guiding slot formed on the backrest, wherein the backrest has at least one positioning slot in communication with the guiding slot; and
    a backrest reclining mechanism comprising:
        a fabric disposed around the backrest, two ends of the fabric being connected to two sides of the main body respectively for supporting the backrest cooperatively with the main body;
        at least one pulley rotatably disposed on the backrest;
        at least one cable wound around the pulley, a first end of the cable extending within the fabric to be connected to the main body; and
        an adjusting device movably disposed on the backrest and connected to a second end of the cable, the adjusting device being used for changing a length of the cable between the first end and the pulley when the adjusting device moves relative to the backrest, so as to adjust a reclining angle of the backrest relative to the seat portion, the adjusting device comprising:
            a sliding board movably disposed along the guiding slot and connected to the second end of the cable; and
            a resilient clip disposed on the sliding board and having a positioning portion and a pressing portion, the positioning portion being used for selectively inserting into and engaging with the positioning slot to fix a position of the sliding board relative to the backrest, or for separating from the positioning slot when the pressing portion is pressed.

10. The stroller of claim 9, wherein the first end of the cable is connected to a position where the fabric is connected to the main body.

11. The stroller of claim 9, wherein the backrest has a plurality of positioning slots spacing along the guiding slot.

12. The stroller of claim 9, wherein the adjusting device further comprises:
    at least one guide pin disposed on the sliding board and positioned in the guiding slot, the guide pin being used for guiding the sliding board along the guiding slot.

13. The stroller of claim 9, wherein two ends of the fabric have a first engaging part respectively, two sides of the main body have a corresponding second engaging part respectively, and the first engaging part is used for engaging with the second engaging part so as to fix the fabric onto the main body.

14. The stroller of claim 13, wherein the first and the second engaging parts are one of complementary snappers and hook-and-loop fasteners.

15. The stroller of claim 13, wherein the first end of the cable is connected to the first engaging part.

16. The stroller of claim 9, wherein the backrest has a supporting portion for supporting the cable.

17. The stroller of claim 9, wherein the backrest reclining mechanism further comprises:
    a protection pipe enveloping the cable.

* * * * *